United States Patent Office 3,244,583
Patented Apr. 5, 1966

3,244,583
PROCESS FOR ADHERING SURFACES WITH A WATER-SOLUBLE DERIVATIVE OF AN ACROLEIN POLYMER AND RESULTING PRODUCTS
Rudolph F. Fischer, Oakland, Clayton A. May, Orinda, and Elliot Bergman, Berkeley, Calif., assignors to Shell Oil Company, New York, N.Y., a corporation of Delaware
No Drawing. Filed Mar. 9, 1962, Ser. No. 178,558
13 Claims. (Cl. 161—250)

This invention relates to a new process for adhering surfaces and to the resulting products. More particularly, the invention relates to a new process for bonding one or more surfaces together using a special type of aldehyde polymer, and to the resulting improved products obtained thereby.

Specifically, the invention provides a new and efficient process for bonding at a fast rate and without the use of curing agents two or more surfaces, and preferably surfaces made from cellulosic materials, to form products having improved bond strength, and excellent dimensional stability, and good water resistance. The new process comprises bonding the surfaces together with a layer of an aqueous solution of a water-soluble derivative of a high molecular weight polymer of an alpha, beta-ethylenically unsaturated aldehyde, and preferably a polyacrolein-sulfur dioxide adduct, and then allowing the bond to cure. The invention further provides the improved products prepared by this process.

As a special embodiment, the invention provides a method for preparing particle board from wood chips which comprises spraying or otherwise applying an aqueous solution of a water-soluble high molecular weight polyacrolein derivative to the wood chips and pressing the chips together in the desired shape. The resulting product possesses excellent strength and dimensional stability.

Adhesives used heretofore for the bonding of wood, such as in the plywood industry, have generally been of the phenolic resin type. These adhesives, however, have not been entirely satisfactory for most applications. Firstly, the phenolic adhesives require the addition of a curing agent and have to be used within a short period from the addition of the curing agent. In addition, the phenolic adhesives are generally difficult to formulate and require considerable mixing before use. Furthermore, the adhesives have a relatively high loading of the resin to obtain an effective bond and this increases cost as well as gives rise to handling problems. Finally, the cure time is rather long and should be shortened for certain applications. The adhesion of these prior known materials to certain types of surfaces is rather limited.

It is an object of the invention, therefore, to provide a new process for adhering surfaces using a special type of resinous material. It is a further object to provide a new process for bonding surfaces together using a special type of aldehyde polymer. It is a further object to provide a process for bonding surfaces that can be accomplished without the use of curing agents. It is a further object to provide a process for adhering surfaces which employs an adhesive having an extended pot life. It is a further object to provide a process for bonding surfaces which uses an adhesive which is easy to formulate and utilize. It is a further object to provide a process for bonding surfaces which can be accomplished in a short period of time. It is a further object to provide a process for adhering surfaces which utilizes an adhesive having a small concentration of resinous material. It is a further object to provide a process for adhering surfaces which gives a product having good strength and water resistance. It is a further object to provide a process for preparing bonded materials having good dimensional stability. It is a further object to provide a process for bonding surfaces that can be utilized with a great variety of different materials. It is a further object to provide an improved process for preparing particle board. These and other objects of the invention will be apparent from the following detailed description thereof.

It has now been discovered that these and other objects may be accomplished by the process of the invention comprising bonding the surfaces, and preferably surfaces of cellulosic materials, together with a layer of an aqueous solution of a water-soluble derivative of a high molecular weight polymer of an alpha, beta-ethylenically unsaturated aldehyde, and preferably a polyacrolein-sulfur dioxide adduct, and then allowing the bond to set hard. It has been surprisingly found that this process permits one to obtain without the use of curing agents and at a very fast rate, good bonds between a great variety of different materials. In addition, the bonds are obtained even when one utilizes very small amounts of the above-noted aldehyde polymer derivatives. Furthermore, the adhesives employed are easy to formulate and handle and have extended pot life. Finally, the products obtained have improved strength, good resistance to water and excellent dimensional stability. The process is particularly outstanding for the preparation of particle board from wood chips.

The adhesive compositions used in the process of the invention comprise solutions of water-soluble derivative of a high molecular weight polymer of an alpha, beta-ethylenically unsaturated aldehyde. These water-soluble derivatives are obtained by treating a substantially water-insoluble high molecular weight polymer of an alpha, beta-ethylenically unsaturated aldehyde as noted below with a solubilizing agent, such as sulfur dioxide, to make the polymer water soluble.

The alpha,beta-ethylenically unsaturated aldehydes used in making the basic polymers comprise those aldehydes having an ethylenic group in an alpha-beta-position relative to the aldehyde group, such as, for example, acrolein, alpha and beta-substituted acroleins, such as, for example, alpha-ethylacrolein, alpha-isobutylacrolein, alpha-amylacrolein, alpha-chloroacrolein, beta-phenylacrolein, alpha-isohexylacrolein, alpha-decyclacrolein, beta-isooctylacrolein, alpha-cyclohexylacrolein, and the like, and mixtures thereof. Preferred aldehydes to be employed in making the polymers include the alpha-beta-monoethylenically unsaturated monoaldehydes containing from 3 to 12 carbon atoms, and especially acrolein and the alpha and beta-substituted acroleins wherein the substituent on the alpha and/or beta positions is an alkyl, cycloalkyl, aryl or alkaryl radical containing no more than 8 carbon atoms. 2-Alkenals containing up to 8 carbon atoms come under special consideration.

The polymers of the above-described aldehydes also include copolymers of the above-described aldehydes with a dissimilar monomer containing an ethylenic group, such as, for example, acrylonitrile, methacrylonitrile, crotonaldehyde, acrylic acid, methacrylic acid, methyl acrylate, ethyl acrylate, methyl methacrylate, butyl acrylate, vinyl acetate, dibutyl maleate, diallyl phthalate, allyl acetate, allyl benzoate, vinyl chloride, vinylidene chloride, styrene, alpha-methyl styrene, butadiene, methylpentadiene, isoprene, vinylpyridine, N-vinylpyrolidone, acrylamide, N-methyl acrylamide, 1,4-octadiene, divinyl adipate, ethylene, propylene, isobutylene, and the like, and mixtures thereof. Particularly preferred monomers to be employed include the alpha-beta-ethylenically unsaturated nitriles, the alkyl esters of the acrylic and alpha-substituted acrylic acids, vinyl esters of monocarboxylic acids, allyl esters of polycarboxylic acids and monocarboxylic acids, monoolefins, polyolefins, nitrogen-containing monomers as the amides of unsaturated carboxylic acids, vinylpyridine and the N-vinylpyrolidones, all members of the foregoing preferably containing no more than 12 carbon atoms each.

The amount of the above-described unsaturated monomers to be employed with the unsaturated aldehydes in making the copolymers may vary over a wide range. In general, the amount of the dissimilar monomer may vary from about .1% to as high as 80 to 90% by weight of the combined mixture. Preferred amounts of the dissimilar monomer vary from about 1% to 50% by weight of the combined mixture.

The polymers of the above-described unsatuarted aldehydes to be used in making the water-soluble derivatives are those obtained by addition polymerization through the double bond of the aldehyde and are those having an intrinsic viscosity of at least 0.3 dl./g. and preferably between 0.5 dl./g. and 3.5 dl./g. These values are determined by the conventional technique of polyelectrolyte viscosity measurements at 25° C. using the water-soluble derivative of the polymer. As expressed in terms of molecular weight, the preferred polymers have molecular weights ranging from about 30,000 to 10,000,000, said weights being determined by the light scattering technique.

The preferred polymers are those possessing a high theoretical aldehyde function, i.e., when the polymer is subjected to conventional tests for the presence of aldehyde groups (e.g., addition of hydroxylamine hydrochloride and titrated liberated water with Karl Fischer reagent) the results show a high percent, e.g., above about 75%, of the theoretical aldehyde groups present as such or in the hydrated form. Many of the preferred polymers have the aldehyde groups present in the hydrated form as

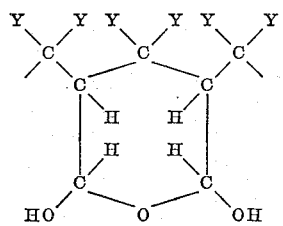

and some

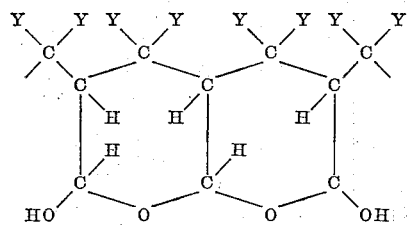

wherein Y is hydrogen or lower alkyl.

The above-described high molecular weight homopolymers and copolymers may be prepared by a variety of different methods. They may be obtained, for example, by polymerizing the monomer or monomers in the presence of free radical yielding catalysts and certain temperature conditions, in the presence of redox polymerization catalysts, or by use of high energy ionizing radiation. Suitable methods for polymerizing the monomers are described and claimed in copending patent application Serial No. 859,156, filed December 14, 1959, now Patent Number 3,079,357; copending application Serial No. 859,154, filed December 14, 1959, now Patent Number 3,167,529; copending application Serial No. 63,987, filed October 21, 1960, now Patent Number 3,105,801, and copending case Serial No. 95,831, filed March 15, 1961, now Patent Number 3,081,244, and so much of the disclosure of these two applications relative to these polymers and their preparation is incorporated into this application.

The preparation of some of the acrolein polymers by the above-noted methods is illustrated below.

*Polymer A.*—100 parts of acrolein was added to 400 parts of water to this mixture was added .271 parts of potassium persulfate, .203 part of ferrous chloride tetrahydrate, 1 part of nonyl-phenol-ethylene oxide adducts as anti-coalescent agent and .4 part of disodium salt of ethylene diamine tetracetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl.)/g.

*Polymer B.*—100 parts of acrolein was added to 300 parts of water and to this mixture was added .272 part potassium persulfate, .203 part of ferrous chloride tetrahydrate and .4 part of disodium salt of ethylene diamine tetracetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

*Polymer C.*—1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetracetic acid. This mixture was stirred for 42 hours at room temperature (20° C.) under nitrogen. The resulting product was a white powder polymer having an intrinsic viscosity of 1.5.

*Polymer D.*—100 parts of acrolein was added to 325 parts of water and to this mixture was added 2.70 parts of potassium persulfate, 2.00 parts of ferrous chloride tetrahydrate and 4 parts of disodium salt of ethylene diamine tetracetic acid. This mixture was kept at room temperature for 6 hours with stirring and under an atmosphere of nitrogen. The resulting 46 parts product was a white powder polymer having an intrinsic viscosity of 1.02 dl./g.

*Polymer E.*—Acrolein was added to water to form a 20% solution. A polyacrolein-sulfur dioxide adduct having an intrinsic viscosity of about 2.26 dl./g. was added to form a 0.2% solution. This mixture was placed in a glass reactor and the air swept out with nitrogen. The reactor was sealed and exposed to X-rays at room temperature. The dose rate was $1.8 \times 10^5$ rads per hour. Reaction time was 1½ hours. The reactor was then opened and the solution filtered to remove the solid polymer. The resulting polymer was a white powder having an intrinsic viscosity of 2.23 dl./g.

*Polymer F.*—Acrolein was added to water to form a 20% solution. Phosphoric acid was then added to form a 1% solution and .2% nonyl-phenol-ethylene oxide adduct was added. This mixture was placed in a glass reactor and air swept out with nitrogen. The reactor was sealed and exposed to an X-ray beam at 25° C. The dose rate was $2.1 \times 16^6$ rads/hour and the total dosage was $1.0 \times 10^6$ rads. The reactor was opened and the solution filtered to remove the slid polymer. The resulting polymer had an intrinsic viscosity of 1.1 dl./g.

The above-described high molecular weight unsaturated aldehyde polymers are insoluble in water. They may be converted into water-soluble derivatives by reaction with water-solubilizing agents, such as aqueous sulfur dioxide, alkali metal bisulfite, ammonium sulfite or bisulfite, sodium hydroxide and the like.

Preferred water-soluble derivatives to be employed in the process comprises the polysulfonic acid or sulfonate derivatives obtained by reacting the high molecular weight polymers with aqueous sulfur dioxide or alkali metal bisulfite. This may be accomplished in a variety of different methods. Preferably, the polymer particles are suspended in an aqueous solution of the desired dissolving agents, such as aqueous sulfur dioxide, and the mixture stirred at room temperature or elevated temperature until the dissolution takes place. The ratio of the polymer and amount of the dissolving agent will depend upon the amount of conversion of the aldehyde groups to the sulfonic acid or sulfonate groups. In general, it is preferred to utilize polymers having from .3 to .9 of the aldehyde groups converted to sulfonic acid or sulfonate groups, and amounts slightly above that needed to reach conversions are preferably employed. Superatmospheric pressures may sometimes be needed to obtain the necessary concentration of the dissolving agent. Temperatures employed for the dissolution preferably vary from about 20° C. to 60° C.

The preparation of several solubilized derivatives is illustrated below.

*Solubilized polymer A.*—10 parts of polymer A was suspended in water so as to form a 10% slurry. $SO_2$ was bubbled into the solution at room temperature for about one hour. The container was sealed and stirred for 24 hours. By that time the polymer had gone into solution. This polymer had an intrinsic viscosity of 1.8 dl./g.

*Solubilized polymer B.*—10 parts of polymer B was suspended in water to form a 10% aqueous slurry. Sulfur dioxide was bubbled into the solution at room temperature for about one hour. The container was sealed and stirred for 24 hours. At that time, the polymer had gone into solution. This polymer had an intrinsic viscosity of 2.3 dl./g.

*Solubilized polymer C.*—10 parts of polymer C was suspended in water to form a 10% aqueous slurry. 5 parts of sodium bisulfite were added and the mixture kept at room temperature. The mixture was stirred for several hours until the polymer had gone into solution. This polymer had an intrinsic viscosity of 1.5.

*Solubilized polymer D.*—10 parts of polymer D was suspended in water to form a 10% aqueous slurry. Sulfur dioxide was bubbled into the solution at room temperature for about one hour. The container was sealed and stirred for 24 hours. By that time, the polymer had gone into solution. This polymer had an intrinsic viscosity of 1.02.

*Solubilized polymer E.*—10 parts of polymer E was suspended in water to form a 10% aqueous slurry. Sulfur dioxide was bubbled into the solution at room temperature for about one hour. The container was sealed and stirred for 24 hours. By that time, the polymer had gone into solution. This polymer had an intrinsic viscosity of 2.23 dl./g.

*Solubilized polymer F.*—10 parts of polymer F was suspended in water to form a 10% aqueous slurry. Sulfur dioxide was bubbled into the solution at room temperature for about one hour. The container was sealed and stirred for 24 hours. By that time, the polymer had gone into solution. This polymer had an intrinsic viscosity of 1.1 dl./g.

When recovered from the aqueous reaction mixture the sulfonic acid and salt derivatives appear as substantially white solid polymeric products. They will have substantially the same instrinsic viscosity as the basic polymers used in their preparation, i.e., they will have intrinsic viscosities preferably ranging from 0.3 dl./g. to as high or higher than 3.5 dl./g. On a molecular weight basis, products will have molecular weights preferably ranging from 30,000 to 5,000,000 or higher as determined by the light scattering technique.

The water soluble derivatives will also be characterized by containing a plurality of free sulfonic acid groups or water soluble salt sulfonate groups. For example, the sulfonic acid polymers may contain units as

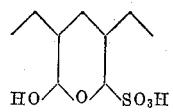

As all the aldehyde groups will not be converted to the sulfonate group, the polymers will also contain some residual hydrated aldehyde groups. They preferably contain from 5% to 20% sulfur.

Another preferred type of water-soluble derivative to be employed in the process of the invention include the polyhydroxy polycarboxylic acids and salts thereof obtained by reacting the above-described high molecular weight polymers or their solubilized derivatives as noted above with a basic material having a dissociation constant greater than $2.0 \times 10^{-5}$, and preferably an alkali metal hydroxide. This reaction is also preferably accomplished in the presence of an aldehyde or ketone, and particularly formaldehyde or a material which liberates formaldehyde. The reaction with the basic material gives the salt form and the acid may be by acidification of the salt solution.

The basic materials used in the reaction are preferably the alkali metal hydroxides, alkaline earth metal hydroxides, strong amines, ammonium hydroxide and the like. Preferred materials to be employed are the water-soluble hydroxides and basic salts of the alkali metals, sodium, potassium and lithium and ammonium hydroxide and basic salts. The pH value of the reaction mixture is preferably between about 8 and 14. When expressed on a normality basis, it is preferred to use reaction media having a normality greater than 0.1 N and preferably between 0.5 N and 10 N.

The degree of alkalinity employed will vary depending on the degree of conversion of the aldehyde or hydrated aldehyde groups to the OH and carboxyl groups. Theoretically one mole of caustic is needed for every two aldehyde groups converted. To obtain high degree of conversions, such as 70 to 90% conversion, solutions of higher normality should be employed, while for the lower conversions, lower normality may be utilized.

As noted, the amount of hydroxyl groups and carboxyl groups present on the acid molecule will depend on the extent of reaction with the alkaline material as noted above. Preferred products have up to 90% of the aldehyde groups or hydrated groups converted to the hydroxyl and carboxyl groups. When less than 100% conversion is made, the resulting polymer will, of course, still possess the aldehyde groups or hydrated groups in the same condition as below. Particularly preferred products possess up to 40% of the aldehyde groups in the structural unit as

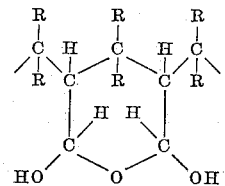

and the remaining groups converted to the structural units as

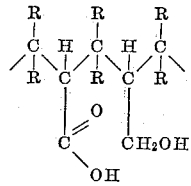

(wherein R is hydrogen or hydrocarbon).

The above-noted reaction with the alkaline material may be accomplished in an inert solvent medium, such as in alcohol and the like. Best results, however, are obtained when conducted in an aqueous medium.

Dilute solutions or suspensions of the polymer are preferred. The concentrations of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline medium in a few minutes and the reaction should be complete in the matter of a few hours. Reaction times generally range from about 20 minutes to about 50 hours.

The resulting hydroxy carboxylic acids will be present in the reaction mixture in the form of the alkaline salt. If this is the desired salt to be used in the treating process, the solution may be used directly in that application. If the salt is not the desired one, the salt may be converted to the acid form by precipitation with acids, such as hydrochloric acid, and then converted to the desired salt by conventional technique, or the salt may be converted directly to the other salt by conventional techniques.

A particularly outstanding and preferred group of salts to be in the process of the invention include the salts of polymeric hydroxy carboxylic acids which have the specific units

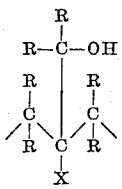

wherein X is —CH$_2$OH,

or —COOH and R is hydrogen or hydrocarbon.

The polymeric hydroxy carboxylic acids used in preparing the above special salts are obtained by reacting the above-noted polymers of unsaturated aldehydes with a basic material having a dissociation constant greater than $2.0 \times 10^{-5}$, and in the presence of an aldehyde or ketone or material which liberates an aldehyde or ketone, and preferably in the presence of formaldehyde.

The basic material used in the reaction may be as described above for the simple basic reaction with the aldehyde polymer. The pH of the reaction mixture is preferably between 7.1 and 14. When expressed on a normality basis, it is preferred to use reaction media having a normality greater than 0.01 N, and preferably between 0.09 N and 2 N.

The other material employed in the reaction comprises an aldehyde or ketone or mixtures thereof. Examples of aldehyde include, among others, formaldehyde and materials liberating formaldehyde as trioxane, paraformaldehyde and the like, acetaldehyde, propionaldehyde, chloropropionaldehyde, butyraldehyde, isobutyraldehyde, valeroaldehyde, caproic aldehyde, heptoic aldehyde, acrolein, methacrolein, nicotinaldehyde, 2-pyrancarboxyaldehyde, tetrahydropyran-2-carboxyaldehyde, 2-furaldehyde, crotonaldehyde, benzaldehyde, 1-naphthaldehyde, durene dialdehyde, glutaraldehyde, 1-cyclohexene-1-carboxyaldehyde, and 2,4 - heptadiene-1-carboxyaldehyde. Preferred aldehydes to be used include those of the formula

wherein R is hydrogen or a hydrocarbon radical, and preferably the aliphatic, cycloaliphatic and aromatic monoaldehydes containing from 1 to 20 carbon atoms, and still more preferably 1 to 12 carbon atoms. Formaldehyde and materials which liberate formaldehyde come under special consideration as the resulting products have particularly outstanding properties for the formation of sizing agents for fibrous materials.

Other materials that may be used in place of or in admixture with the above-described aldehydes include the ketones, and preferably the monoketones, such as, for example, methyl ethyl ketone, methyl isobutyl ketone, dimethyl ketone, diethyl ketone, dibutyl ketone, diisobutyl ketone, ethyl octyl ketone, methyl phenylketone, methyl cyclohexyl ketone, dioctyl ketone, allyl methyl ketone, methyl isopropenyl ketone, beta - chloroallyl methyl ketone, methoxymethyl butyl ketone, and the like. Preferred ketones include those of the formula

wherein R is a hydrocarbon radical. Especially preferred are the aliphatic, cycloaliphatic, aromatic monoketones containing from 3 to 20 carbon atoms, and still more preferably from 3 to 12 carbon atoms. Dialkyl ketones come under special consideration.

The degree of alkalinity employed will vary depending on the degree of conversion of the aldehyde or hydrated aldehyde groups to the OH and carboxyl groups. Theoretically one mole of caustic is needed for every two aldehyde groups converted. To obtain high degree of conversions, e.g., 70% to 99% conversions, solutions of higher normality should be employed, while for the lower normality may be utilized. Preferably from 10% to 95% of the groups are converted to the OH and carboxyl groups.

The amount of the aldehyde or ketone employed will vary depending on the degree of conversion of the hydrogen atoms on the alpha carbon atom relative to the aldehyde or hydrated aldehyde groups to the

groups. Theoretically one mole of aldehyde or ketone is needed for every unit of aldehyde in the polymer chain to be converted. Preferably from 5% to 95% of the said hydrogen are converted and still more preferably from 10% to 90% of the said hydrogen are converted and still more preferably from 10% to 90% of the said hydrogen.

The reaction may be accomplished in an aqueous medium or in an inert solvent medium, such as in alcohol and the like. Best results, however, are obtained when conducted in an aqueous medium.

Dilute solutions or suspensions of the polymer are preferred. The concentration of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline reaction medium in a few minutes and the reaction should be complete in the matter of a few hours. Reaction times generally vary from about 20 minutes to about 50 hours.

The desired hydroxy carboxylic acids will be present in the reaction mixture in the form of the alkaline salt. If this is the desired salt to be utilized in the treating process, the solution may be used directly in the application. If the salt is not the desired one, the salt may be converted to the acid form by the addition of acid, such as hydrochloric acid, and then converted to the desired salt by conventional techniques, or the salt may be converted to the desired salt by conventional techniques, or the salt may be converted directly to the other salt by conventional techniques.

The cationic or positive portion of the salt to be employed in the process may vary depending on the medium employed and intended application. Preferred salts include the ammonium, amine and metal salts, and particularly the alkali and alkaline earth metal salts. Examples include, among others, the sodium, potassium, lithium, ammonium, copper, zinc, magnesium, iron, cadmium, calcium, barium, and the like. Preferred metals have atomic weights from 22 to 190.

The salts are preferably prepared by treating the above-described hydroxy carboxylic acids with the desired inorganic salt or hydroxide, such as NaOH, KOH, copper sulfate, zinc sulfate, magnesium chloride, and the like, preferably in the presence of a diluent as water, alcohol and the like.

The preparation of a polyhydroxy polycarboxylic acid derivative by the above method is illustrated below.

*Polyhydroxy polycarboxylic acid derivative A.*—310 parts of a solid polyacrolein having an intrinsic viscosity of 1.6 dl./g. and containing 88.5% water was mixed with 300 parts of water and 25 parts of 37% formalin. 1200 parts of 1 N NaOH was added to this solution at 5° C. under nitrogen with stirring. The mixture was then allowed to stand at room temperature with stirring. After standing several days, the mixture was diluted with 2000 parts of water. This mixture was made acid to pH of 2.5 with 240 parts of 5 N sulfuric acid. A white granular polymer precipitated. The polymer identified as a polyhydroxy polycarboxylic acid had an intrinsic viscosity of about 1.6 dl./g., an OH value of 0.778 eq./100 g., acidity of 0.4 eq./100 g. and carbonyl value of 0.354 eq./100 g.

When recovered from the aqueous reaction mixture, the hydroxy carboxylic acid and salt derivatives will appear as substantially white solid polymeric products. They will have substantially the same intrinsic viscosity as the basic polymers used in their preparation. They will also contain a plurality of units as

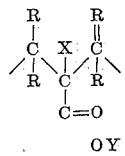

and

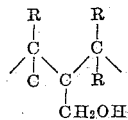

wherein X is hydrogen or

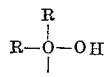

groups wherein R is hydrogen or a hydrocarbon radical, and Y is hydrogen or a water-soluble salt material as a metal or ammonium group. As all the aldehyde groups will not be converted to such forms, the polymer will also preferably contain some residual hydrated aldehyde groups.

It is preferred to use the above-noted sulfonic acid or carboxylic acid derivatives rather than the neutralized or salt derivatives as they tend to give products having much better water resistance.

The adhesive compositions of the present invention are prepared by adding the above-noted water solubilized derivative of the aldehyde polymer to water to form a solution having the desired solids content. If the derivative was formed in a aqueous medium as noted above, that solution may be used in making the adhesive without first isolating the derivative.

The solutions preferably have a solids content of at least 5% and preferably between 5% and 10%.

Other desired materials may be added to the adhesive as needed. These include, among others, fillers, such as asbestos, crushed walnut shells, wood flours, powdered aluminum, iron, silica, and the like, pigments, other resins, dyes, stabilizers, plasticizers and the like.

The above-noted adhesives are utilized by merely applying the solutions to the desired surface or surfaces to be bonded together. The application can be made by any suitable means, such as spreading with a doctor blade, spraying, dipping, painting and the like. One or both of the surfaces to be bonded may be treated in this manner. In general, it is preferred to merely apply the solution to one surface and superimpose the other surface thereon.

The thickness of the adhesive layer may vary over a wide range. In general, it is preferred to utilize a layer varying from 0.0005 to 0.1 inch thick.

After the adhesive has been applied and the sheets assembled together and pressure applied to secure the bond, the assembly may be allowed to set to cure the bonding material. The curing may be allowed to take place at room temperature, or heat may be applied to hasten the cure. Preferred temperatures range from about 20° C. to about 150° C. Pressures employed may vary from about 25 p.s.i. to 1000 p.s.i.

The adhesive may be used to bond two sheets together or a multiple layer of sheets such as in plywood. The multisheet laminated products are preferably prepared by assembling a lay-up of a plurality of sheets of the fibrous material impregnated with the above-noted adhesive composition, placing the assembly in a press and applying heat and pressure with the aid of the press. Especially with planar cloth laminates, it is helpful in attaining best strengths in all directions to have alternate layers of the material placed at 90° angles from the direction of weave. The assembly of superimposed and impregnated sheets can be cured at elevated temperatures and pressures. Moderate pressures are effective to secure smooth surface laminates such as up to 50 pounds per square inch but higher pressures may be employed if desired.

The laminated products can be prepared as flat sheets or in curved shapes. The form of the press platens will determine the shape of the finished laminate. Thus, curved products can be prepared by use of press platens that are arc-shaped or otherwise curved in one direction as well as platens with double curvature like a segment of a sphere.

The adhesive compositions of the present invention can be used for the bonding of a great variety of different materials, such as those which are fibrous, porous or impervious. Examples of such materials include, among others, wood, glass, glass cloth, fabrics, paper, plaster of Paris, metals and the like. Particularly preferred materials are the cellulosic materials as wood, paper and cellulosic fabrics as cotton. Results obtained from wood-to-wood bonding as in the preparation of particle board, plywood, and the like, are particularly outstanding.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and use of an adhesive containing a sulfur dioxide adduct of polyacrolein.

(A) A polyacrolein having an intrinsic viscosity of 1.6 dl./g. was added to aqueous sulfur dioxide to form a sulfur dioxide adduct containing about 16% sulfur. This solution was diluted with water to form a solution containing 8.5% solids. This solution was applied to the surface of maple blocks by means of a doctor blade.

The solution was applied at the rate of about 60 lbs. per 1000 sq./ft. of bond line. The blocks were placed face to face, moved back and forth slightly to insure a uniform spread and then the assembly was placed in a steam heated platen press and cured at 285° F. for 10 minutes under pressure of 200 p.s.i. The resulting assembly had excellent strength and good resistance to water. The assembly had a block shear strength of 3020 p.s.i. The failure was in the wood rather than the adhesive.

(B) In a related experiment, an adhesive was a commercial phenol-aldehyde adhesive using a mixture of water, extender, flake caustic soda, soda ash and phenol-aldehyde resin. This mixture was far more difficult to formulate and after the bond was cured as noted above possessed a block shear strength of only 2620 p.s.i. In this case some of the failure was in the adhesive.

*Example II*

Example I(A) is repeated with the exception that the adduct employed is prepared from polyacrolein having an intrinsic viscosity of 2.0 dl./g. and contained 16% sulfur. In this case, the resulting assembly also possesses good block shear strength with the failure being only in the wood.

*Example III*

Example II was repeated with the exception that 35 parts of modified cellulose, liquid and furfural resin were included in the adhesive composition. The resulting assembly also possessed good block shear strength with the failure being only in the wood.

*Example IV*

Example I was repeated with the exception that 25 parts per 100 parts of the adduct of aluminum sulfate was added to the adhesive. The resulting assembly possessed good block shear strength with the failure being only in the wood.

*Example V*

A polyacrolein having an intrinsic viscosity of 1.6 dl./g. was added to aqueous sulfur dioxide to form a sulfur dioxide adduct containing 2% sulfur. This product was neutralized by the addition of sodium hydroxide. The solution was then diluted with water to form a solution containing 10.4% solids. This solution was then applied to the surface of maple blocks as in Example I(A). The blocks were placed face to face, moved back and forth to insure a uniform spread and then the assembly was placed in a steam heated platen press and cured at 285° F. for 10 minutes under a pressure of 200 p.s.i. The resulting assembly had excellent strength.

*Example VI*

Example V was repeated with the exception that 19 parts per 100 parts of the adduct of aluminum sulfate was added to the adhesive. The resulting assembly demonstrated good strength.

*Example VII*

This example demonstrates the rapid cure that is obtained by the use of the process of the invention as compared to the use of commercial phenol-aldehyde adhesives.

A polyacrolein having an intrinsic viscosity of 1.6 dl./g. was added to aqueous sulfur dioxide to form a sulfur dioxide adduct containing about 16% sulfur. This solution was diluted with water to form a solution containing 8.8% solids. This solution was applied to the surface of ample blocks as in Example I(A) and the block assembly placed in a steam heated platen press and cured at 285° F. and pressure of 200 p.s.i. The block shear strength was determined periodically as shown in the table below.

The above experiment was repeated using a phenol-aldehyde resin adhesive prepared as in Example I. The block shear strength was determined periodically as shown in the table below:

| Adhesive | Cure time, min. | Block shear strength, p.s.i. |
| --- | --- | --- |
| Polyacrolein-sulfur dioxide | 1 | 160 |
| Do | 2 | 1,050 |
| Do | 3 | 2,000 |
| Do | 5 | 2,370 |
| Do | 7 | 2,290 |
| Do | 10 | 2,290 |
| Phenol-aldehyde resin | 1 | 0 |
| Do | 2 | 0 |
| Do | 3 | 0 |
| Do | 5 | 2,250 |
| Do | 7 | 2,070 |
| Do | 10 | 1,970 |

From the above, it is apparent that the rate of cure of the polyacrolein-sulfur dioxide adduct is faster than that of the phenol-aldehyde resin during the early period of contact.

*Example VIII*

This experiment demonstrates the use of an adhesive having a high solids content.

A polyacrolein having an intrinsic viscosity of 1.6 dl./g. was added to aqueous sulfur dioxide to form a sulfur dioxide adduct. This solution was neutralized by the addition of sodium hydroxide. This product was diluted with water to form a solution containing 22.1% solids. The solution was then applied to the surface of maple blocks as in Example I(A). The assembly was placed in a steam heated platen press and cured at 285° F. for 60 minutes under pressure of 200 p.s.i. The resulting assembly had a block shear strength of 2300 p.s.i.

*Example IX*

A polyacrolein having an intrinsic viscosity of 1.4 dl./g. was added to aqueous sulfur dioxide to form a sulfur dioxide adduct containing about 14% sulfur. This solution was neutralized by the addition of sodium hydroxide. The product was diluted with water to form a solution containing 38.7% solids. The adhesive solution was then applied to the surface of maple blocks as in Example I(A). The assembly was placed in a steam heated platen press and cured at 285° F. for 20 minutes under pressure of 200 p.s.i. The resulting assembly had a block shear strength of 2390 p.s.i.

*Example X*

This example demonstrates the good aging properties of the adhesive bonds prepared by the process of the invention.

A polyacrolein having an intrinsic viscosity of 1.6 dl./g. was added to aqueous sulfur dioxide to form a sulfur dioxide adduct containing 16% sulfur. This solution was then applied to the surface of maple blocks as in Example I(A). The assembly was placed in a steam heated platen press and cured at 285° F. for 60 minutes under pressure of 200 p.s.i. The resulting assembly had a block shear strength of 2440 p.s.i.

The above assembly was aged 18 days and the block shear strength was then measured. The assembly had a strength at that time of 2500 p.s.i. After 74 days of aging, the assembly had a strength of 2330 p.s.i.

*Example XI*

The polyacroleins shown in the table below were converted to sulfur dioxide adducts as shown in Example I(A). The materials were then converted to solutions having the indicated solids content and then used as an adhesive for maple blocks. The block shear strength for each case is given in the table:

| Polyacrolein-SO₂ adducts | Solids, percent | Block shear strength |
|---|---|---|
| (A) Polyacrolein-SO₂ adduct having I.V. of 1.6 dl./g. | 8.7 | 2,450 |
| (B) Polyacrolein-SO₂ adduct having I.V. of 1.5 dl./g. | 4.9 | 2,500 |
| (C) Polyacrolein-SO₂ adduct having I.V. of 1.5 dl./g. | 7.4 | 2,220 |
| (D) Polyacrolein-SO₂ adduct having I.V. of 1.6 dl./g. | 9.0 | 2,490 |

*Example XII*

The assemblies made in the preceding example were tested for resistance to boiling for 2 hours. The block shear strength for the assemblies after this period are shown in the following table:

| Polyacrolein-SO₂ adducts | Block shear after boiling water test, p.s.i. |
|---|---|
| (A) Polyacrolein-SO₂ adduct having I.V. of 1.6 dl./g. | 1,000 |
| (C) Polyacrolein-SO₂ adduct having I.V. of 1.5 dl./g. | 800 |
| (D) Polyacrolein-SO₂ adduct having I.V. of 1.6 dl./g. | 625 |

*Example XIII*

Example I(A) was repeated with the exception that the following polymers were used in place of the indicated polyacrolein: polyacrolein of intrinsic viscosity of 0.79 dl./g., polyacrolein of intrinsic viscosity of 1.62 dl./g., polyacrolein of intrinsic viscosity of 1.92 dl./g., and polyacrolein of intrinsic viscosity of 2.6 dl./g. Related results are obtained in each case.

*Example XIV*

Example I(A) is repeated with the exception that the polymer employed to make the adduct is a copolymer of acrolein and acrylonitrile (95:5 weight ratio). Related results are obtained.

*Example XV*

Example I(A) is repeated with the exception that the polyacrolein is replaced with a copolymer of acrolein and butadiene (90–10 ratio). Related results are obtained.

*Example XVI*

Example I(A) is repeated with the exception that adhesive is used to bond the following together: glass-to-glass; plastic-to-plastic; polypropylene-to-polypropylene; polystyrene-to-polystyrene; polyethylene-to-polyethylene; cement-to-cement; granite and polyformaldehyde. Good bonds are obtained in each case.

*Example XVII*

Example I(A) is repeated with the exception that the adhesive is used to prepare particle board by spraying the adhesive over wood chips and pressing the chips together to form a sheet of wood at 285° F. and 2000 p.s.i. The resulting product is a strong tough particle board.

*Example XVIII*

Example I(A) is repeated with the exception that the adhesive is used to bond paper and cardboard together. Good bonds are obtained.

*Example XIX*

Example I(A) is repeated with the exception that the adhesive is used to bond masonite together. Good bonds are also obtained.

*Example XX*

This example illustrates the preparation and use of an adhesive containing a polyhydroxy polycarboxlyic acid obtained by reacting polyacrolein with sodium hydroxide and formaldehyde.

A polyhydroxypolycarboxylic acids prepared as shown above (identified as polyhydroxy polycarboxylic acid derivative A) was added to water to form a solution having a solids content of 30%. The initial pH was 11 and sulfuric acid was added to bring the pH to 4. The solution was then applied to the surface of maple blocks as in Example I(A). The assembly was placed in a steam heated platen press and cured at 285° F. for 10 minutes under pressure of 200 p.s.i. The resulting assembly had a strength of 1670 p.s.i.

*Example XXI*

Example XX is repeated with the exception that the adhesive is used to bond cardboard together and to bond wood chips together to form particle board. Good bonds are obtained in each case.

*Example XXII*

Solubilized polymers A through F are used to form an aqueous solid having about 9.0% solids. This solution is used to bond pieces of oak wood together as shown in Example I. Good bonds are obtained in all cases.

We claim as our invention:

1. A process for adhering surfaces made of cellulosic material together which comprises applying a composition consisting of an aqueous solution of a water-soluble derivative of an acrolein polymer obtainable by reacting the polymer with a member of the group consisting of sulfur dioxide, an alkali metal bisulfite, ammonium sulfite, ammonium bisulfite and sodium hydroxide to at least one of the surfaces to be bonded, pressing the surfaces together and allowing the combination to set until the adhesive solution has set hard, said polymer of acrolein having an intrinsic viscosity between 0.5 dl./g. and 3.5 dl./g. obtained by addition polymerization of the acrolein through the ethylenic double bond.

2. A process as in claim 1, wherein the water-soluble derivative is a sulfur dioxide adduct of the acrolein polymer.

3. A process as in claim 1, wherein the water-soluble derivative is a polyacrolein-sulfur dioxide adduct containing from 0.3 to 0.8 mol of sulfur dioxide per mole of acrolein units in the polymer.

4. A process as in claim 1, wherein the surfaces are wood.

5. A process as in claim 1, wherein the bonded material is heated to accelerate cure.

6. A process as in claim 1 wherein the aqueous adhesive solution contains a filler.

7. A process for preparing multilayer plywood product which comprises applying a composition consisting of an aqueous solution of water-soluble derivative of an acrolein polymer obtainable by reacting the polymer with a member of the group consisting of sulfur dioxide, an alkali metal bisulfite, ammonium sulfite, ammonium bisulfite and sodium hydroxide to the surfaces of at least three sheets of wood, superimposing the treated sheets, pressing and applying heat to accelerate the cure, said polymer of acrolein having an intrinsic viscosity between 0.5 dl./g. and 3.5 dl./g. obtained by addition polymerization of acrolein through the ethylenic double bond.

8. A process as in claim 7 wherein the water-soluble derivative is a polyacrolein-sulfur dioxide adduct containing from 0.3 to 0.8 mols of sulfur dioxide per mole of acrolein units in the polymer.

9. A process as in claim 7 wherein the water-soluble derivative is a sulfur dioxide adduct of acrolein-acrylonitrile copolymer containing about 5% acrylonitrile.

10. A process as in claim 7 wherein the pressure applied varies from 50 p.s.i. to 2000 p.s.i. and the temperature employed varies from 50° F. to 250° F.

11. A product prepared by the process of claim 1.

12. A process for adhering surfaces made of cellulosic material together which comprises applying a composition consisting of an aqueous solution of a polyhydroxy polycarboxylic acid derived from a polyacrolein having an intrinsic viscosity between 0.5 dl./g. and 3.5 dl./g. to at least one of the surfaces to be bonded, pressing the surfaces together and allowing the assembly to set until the bond is cured.

13. A process for preparing particle board which comprises applying a composition comprising an aqueous solution of a polyacrolein-sulfur dioxide adduct to the surface of wood chips, pressing the chips together into the desired shape and allowing the assembly to set until the bond is cured said polyacrolein having an intrinsic viscosity between 0.5 dl./g. and 3.5 dl./g. obtained by addition polymerization of acrolein through the ethylenic double bond and said sulfur dioxide adduct possessing from 0.3 to 0.8 mol of sulfur dioxide per mole of acrolein unit in the polymer.

References Cited by the Examiner

UNITED STATES PATENTS

| | | | |
|---|---|---|---|
| 2,786,008 | 3/1957 | Herschler | 156—335 |
| 3,079,296 | 2/1963 | Houff et al. | 260—67 |
| 3,079,357 | 2/1963 | Fischer | 260—67 |

FOREIGN PATENTS

| | | |
|---|---|---|
| 797,459 | 7/1958 | Great Britain. |

SAMUEL H. BLECH, *Primary Examiner.*

LEON J. BERCOVITZ, MURRAY TILLMAN,
*Examiners.*